(12) United States Patent
Zhan et al.

(10) Patent No.: US 11,029,677 B2
(45) Date of Patent: Jun. 8, 2021

(54) METHOD OF ASSESSING RELIABILITY OF ELECTRONICS ASSEMBLIES UNDER DRILLING VIBRATION CONDITIONS

(71) Applicants: China Petroleum & Chemical Corporation, Beijing (CN); Sinopec Tech Houston, LLC., Houston, TX (US)

(72) Inventors: Sheng Zhan, Houston, TX (US); Jinhai Zhao, Houston, TX (US); Fengtao Hu, Houston, TX (US); Herong Zheng, Houston, TX (US)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 424 days.

(21) Appl. No.: 15/858,978

(22) Filed: Dec. 29, 2017

(65) Prior Publication Data

US 2019/0204819 A1 Jul. 4, 2019

(51) Int. Cl.
| | |
|---|---|
| *G05B 23/02* | (2006.01) |
| *E21B 44/00* | (2006.01) |
| *E21B 17/16* | (2006.01) |
| *G05B 13/04* | (2006.01) |
| *E21B 7/04* | (2006.01) |
| *E21B 47/007* | (2012.01) |

(52) U.S. Cl.
CPC ............ *G05B 23/0243* (2013.01); *E21B 7/04* (2013.01); *E21B 17/16* (2013.01); *E21B 44/005* (2013.01); *E21B 47/007* (2020.05); *G05B 13/04* (2013.01)

(58) Field of Classification Search
CPC ....... G05B 23/0243; G05B 13/04; E21B 7/04; E21B 7/16; E21B 44/005; E21B 47/0006; G06F 30/23; G01M 7/022; G01R 31/28
USPC .......................................................... 73/81
See application file for complete search history.

(56) References Cited

U.S. PATENT DOCUMENTS

| | | | | |
|---|---|---|---|---|
| 5,744,975 A | * | 4/1998 | Notohardjono .... | G01R 31/2817 324/750.05 |
| 5,847,259 A | * | 12/1998 | Hu ........................ | G01M 7/022 73/1.01 |

(Continued)

FOREIGN PATENT DOCUMENTS

| | | |
|---|---|---|
| CN | 1442892 A | 9/2003 |
| CN | 1578590 A | 2/2005 |

(Continued)

*Primary Examiner* — Octavia Hollington
(74) *Attorney, Agent, or Firm* — Novick, Kim & Lee, PLLC; Allen Xue

(57) ABSTRACT

A method for assessing reliability of an electronic component under downhole vibration conditions include designing a set of vibration test conditions and conduct failure analysis. The vibration test conditions include the natural vibration frequency, the overstress limit of the test vehicle, and the step stress profile for testing the test vehicle. The failure analysis of the failed electronic component includes the step of measuring an electrical resistance of the failed electronic component without a vibration load. When the electrical resistance of the failed electronic component remains large, the failed electronic component is cross-sectioned. Finally, the cross-sectioned electronic component is examined to identify a failure mode.

14 Claims, 10 Drawing Sheets

(56) References Cited

U.S. PATENT DOCUMENTS

| | | | |
|---|---|---|---|
| 6,847,907 B1* | 1/2005 | Novotny | B81C 99/0045 438/17 |
| 6,864,701 B2* | 3/2005 | Yao | H01L 22/34 324/762.01 |
| 7,217,645 B2* | 5/2007 | Yamashita | H01L 24/10 228/103 |
| 7,975,252 B2* | 7/2011 | Varon-Weinryb | G06F 30/23 716/136 |
| 8,945,343 B2* | 2/2015 | Wagner | C25F 7/00 156/345.18 |
| 2006/0118601 A1* | 6/2006 | Brandenburg | H01L 23/3735 228/175 |
| 2007/0197020 A1* | 8/2007 | Ramappa | H01L 22/24 438/622 |
| 2013/0082031 A1 | 4/2013 | Wagner | |
| 2014/0231127 A1* | 8/2014 | Manero | H05K 3/243 174/266 |

FOREIGN PATENT DOCUMENTS

| | | |
|---|---|---|
| CN | 101267714 A | 9/2008 |
| CN | 201892613 U | 7/2011 |
| CN | 202926322 U | 5/2013 |

* cited by examiner

METHOD OF ASSESSING RELIABILITY OF ELECTRONICS ASSEMBLIES UNDER DRILLING VIBRATION CONDITIONS

TECHNICAL FIELD

The present disclosure relates to electronic devices for drilling operations, particularly relates to methods and apparatus for assessing reliability of the printed circuit board assembly (PCBA) under drilling vibration conditions.

BACKGROUND

Modern oil and gas explorations are carried out in complex geologic settings. The drilling operations rely heavily on real time information on the status of the drilling tools as well as the earth formation properties. The information is obtained using sensors and measurement-while-drilling (MWD) and logging-while-drilling (LWD) instruments. Although MWD refers to the measurement of the movement and location of the drilling assembly while the drilling continues and LWD focuses more on the measurement of formation properties, they are used interchangeably in this disclosure. MWD/LWD instruments are often installed in the drill collar inside the drilling assembly (i.e., bottom hole assembly or BHA).

Sensors are employed to obtain measurements in the MWD/LWD instruments and the wireline logging approach. Other electronic components include active components, such as printed circuit board assemblies (PCBA) and transistors, or passive components, such as resistors and capacitors.

PCBAs are used throughout the drilling system. For example, they can be used in the operation of the power supply, temperature sensors, pressure transducers, the battery, etc. PCBAs such as the master memory board, the read out board, the transmitter or a receiver board, and the accelerometer board are among electronic devices commonly used in a downhole environment.

PCBAs can be coupled to various sensors in a drilling system by known methods. In some embodiments, sensors may be integrated on a master memory board. Sensors can be measurement sensors that monitor real-time conditions during a drilling process. For example, some sensors monitor the properties of earth formation such as resistivity, density, porosity, permeability, acoustic properties, nuclear-magnetic resonance properties, corrosive properties of the fluids or formation, and salt or saline contents. Other sensors monitor the condition of drilling tools, such as vibrations (lateral, torsional, axial, etc.), orientations, and accelerations in the drill bit or drill strings. Still other sensors monitor the temperature and pressure of the downhole environment. In other embodiments, sensors may be prognostic sensors. Prognostic sensors are subject to more severe conditions than in a typical drilling operation (e.g., higher temperature or pressure) so that they fail at an accelerated rate. They could be used to estimate the time of failure of another component.

Sensors can be mounted on any other suitable components in a drilling assembly. For example, they can be attached to a drill bit to monitor its movement or temperature. Sensors can also be mounted along the borehole, for example, to monitor the pressure or flow rate of the drilling mud along its path. Sensors (e.g., RFID) can even be put into the fluid in the drilling system and be dispersed into the earth formation.

Downhole drilling tools, especially the drilling assembly (a.k.a. BHA), are exposed to high temperatures, pressures, as well as vibrations. It is well known that vibrations can be very destructive. Downhole vibrations alone or in combination with resonance can have myriad negative effects on the drilling operation, including poor drill bit performance, erratic downhole torque, excessive wear of drill string components, initiation and propagation of cracks in and on the body of the tools, failure of the electronic components in the drilling tools, and damage to the top drive and other rig equipment.

Vibration tests are used to understand damages caused by vibrations. However, it is difficult to pinpoint the failure site and the failure mode. In vibration tests of electronic components, often the monitored electrical resistance shows high value or open when the vibration loading is on; but the resistance immediately back to normal when the vibration loading is off. The possible reason is that the cracks on the solder joints are so small that they "heal" again while the stress is off. In other cases, however, failure recorded during testing might have been due to failure in the wire that connects the board to the data logger. Therefore, the detail and systemically failure analysis is required to identify the failure site and modes.

SUMMARY

The present disclosure provides a method for assessing reliability of an electronic component under downhole vibration conditions. First, one or more electronic components are mounted on a printed circuit board to form a test vehicle. Second, the natural vibration frequency of the test vehicle are determined. A test vibration frequency range that covers the natural vibration frequency of the test vehicle is then determined. The overstress limit of the test vehicle is also tested and determined. Subsequently, the step stress profile for testing the test vehicle is determined. The step stress profile for testing has a maximum value lower than the overstress limit of the test vehicle. Subsequently, the test vehicle is tested according to the step stress profile until one or more of the plurality of electronic components on the test vehicle fails.

The failure analysis of the failed electronic component includes the step of measuring an electrical resistance of the failed electronic component without a vibration load. When the electrical resistance of the failed electronic component remains large without a vibration load, the failed electronic component is cross-sectioned. Finally, the cross-sectioned electronic component is examined to identify a failure mode. The examination is carried out using an optical microscope, an X-ray inspection equipment, or elemental analysis methods.

In some embodiments, the electronic component being tested is a plastic dual in-line package (PDIP) insertion mounted on the test vehicle. In other embodiments, the electronic component is soldered to the printed circuit board. The solder is Sn37Pb (SnPb) or Sn3.0Ag0.5C (SAC).

In still other embodiments, the printed circuit board has one or more pads. The pad finish is Hot Air Solder Leveled (HASL), immersion Sn (ImSn), immersion Ag (ImAg), electroless nickel immersion gold (ENIG), or organic solubility preservative (OSP).

In further embodiments, the electronic component has been aged at an elevated temperature for a period of time, or has aged at a subzero temperature for a period of time.

BRIEF DESCRIPTION OF THE DRAWINGS

The teachings of the present invention can be readily understood by considering the following detailed description in conjunction with the accompanying drawing.

DETAILED DESCRIPTION

Figure 1:
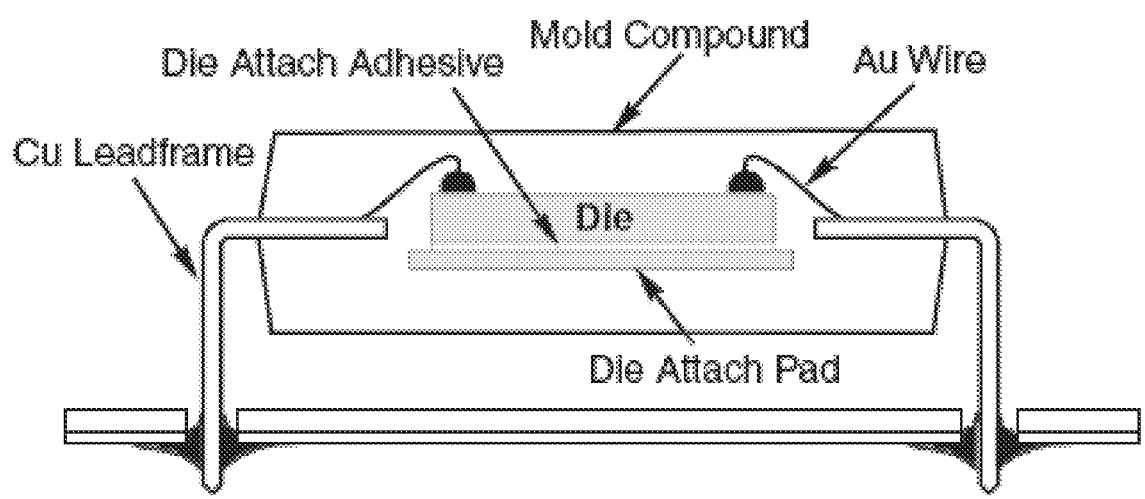
FIG. 1 is a cross-sectional view of a PDIP insertion mounted on a circuit board.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Reference will now be made in detail to embodiments of the present disclosure, examples of which are illustrated in the accompanying drawings. It is noted that wherever practicable, similar or like reference numbers may be used in the drawings and may indicate similar or like elements.

In one embodiment of this disclosure, reliability of exemplary electronic component, i.e., single sided insertion mount assemblies, under random vibrations were examined. The exemplary test vehicle consisted of 12 plastic dual in-line packages (PDIP or package) labelled in alphabetical order from A to G. PDIP A to PDIP G were single sided insertion mounted on a CEM-1 board of size 8"×7"×0.062". The board material properties were measured and listed in Table 1.

TABLE 1

| Board | Tg (° C.) | CTE (in-plane) (ppm/° C.) | | Young's modulus (MPa) | Plating Material | Board Thickness (mm) | Plate Through Hole (mm) | | |
|---|---|---|---|---|---|---|---|---|---|
| | | Below Tg | Above Tg | | | | Spacing | Hole Diam. | Pad Diam. |
| CEM-1 | 60 | 24.9 | 8.5 | 16001 | Cu | 1.625 | 2.54 | 0.635 | 1.651 |

Each PDIP has 48 Cu pins that are equally laid out on two longer edges. Table 2 shows the characteristics of the package used in the study. All pins in the same side of the package are connected in a linear series, i.e., in one daisy chain. For example, PDIP A has two daisy chains, one along each longer edge.

TABLE 2

| | |
|---|---|
| Part Length | 61.75 mm |
| Part Width | 13.75 mm |
| Part Weight | 3.75 mm |
| Lead Span | 13.97 mm |
| Pitch Space | 2.58 mm |
| Maximum I/O | 48 |
| Solder Joint Height | 1.08 mm |

Table 3 lists the design parameters of single-sided insertion mount test vehicle. Two types of solders were used: Sn37Pb (SnPb) and Sn3.0Ag0.5C (SAC). For SnPb assemblies, the PCB pad finish is Hot Air Solder Leveled (HASL) and lead terminal metallurgy finish is SnPb. For SAC assemblies, 4 types of PCB pad finishes were investigated: immersion Sn (ImSn), immersion Ag (ImAg), electroless nickel immersion gold (ENIG), and organic solubility preservative (OSP). The lead terminal metallurgy finish for all SAC assemblies is Matte Sn.

TABLE 3

| Solder Paste | PCB Pad Finish | Component Terminal Metallurgy finish |
|---|---|---|
| Sn37Pb | HASL | SnPb |
| Sn3.0Ag0.5C (SAC) | ImSn | Matte Sn |
| | ImAg | |

TABLE 3-continued

| Solder Paste | PCB Pad Finish | Component Terminal Metallurgy finish |
|---|---|---|
| | ENIG | |
| | OSP | |

FIG. 1 is a cross-sectional view of the PDIP single sided insertion mounted. It has a die attached to a pad, encapsulated in a mold compound. The die is attached to a pair of copper leads though gold wires. The lead terminals are inserted into holes in the CEM-1 board and affixed to the board by respective solder fillets.

The durability test matrix is shown in Table 4. Test samples are grouped based on aging conditions, solder material, and/or PCB pad finishes. In Table 4, each cell has 24 PDIP components mounted on a test vehicle. The daisy chained PDIPs' resistances were monitored using an Agilent® data logger. Failure criteria were defined as resistance value over 50 Ohms occurring 10 times within 10% of the time/cycles.

TABLE 4

| Solder/Pad Finish | Aging Conditions | | |
|---|---|---|---|
| | 125° C./100 hrs | 125° C./350 hrs | −55° C./1000 hrs |
| SnPb/HASL | 24 | 24 | 24 |
| SAC/OSP | 24 | 24 | 24 |
| SAC/ImAg | 24 | 24 | 24 |
| SAC/ImSn | 24 | 24 | 24 |
| SAC/ENIG | 24 | 24 | 24 |

Figure 2:
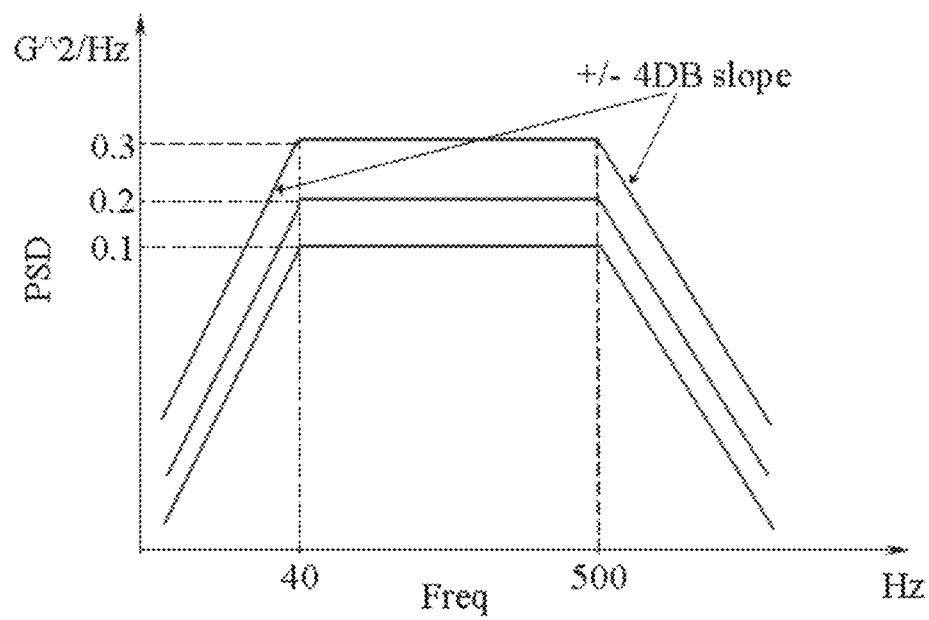
FIG. 2 shows a random vibration loading as a power spectral density (PSD) vs. vibrational frequency.

The random vibration loading is shown in FIG. 2 as a Power Spectral Density (PSD) vs. Frequency curve. The PSD level ranged from 0.1 to 0.3 G$^2$/Hz during the tests. The frequency range was from 40 to 500 Hz.

Table 5 lists the G levels (Grms) corresponding to input PSD loadings obtained from the vibration shaker. In a first group of tests, the test vehicle was affixed to a vibration shaker via a 4-point support at the four corners of the board.

TABLE 5

| Input PSD level (G$^2$/Hz) | 0.04 | 0.1 | 0.2 | 0.3 | 0.4 | 0.6 |
|---|---|---|---|---|---|---|
| Corresponding G Level (Grms) | 4.8 | 7.5 | 10.7 | 13.1 | 15.1 | 18.5 |

The vibration tests include natural frequency measurements, overstress limit determination, step stress profile and durability tests.

Figure 3:
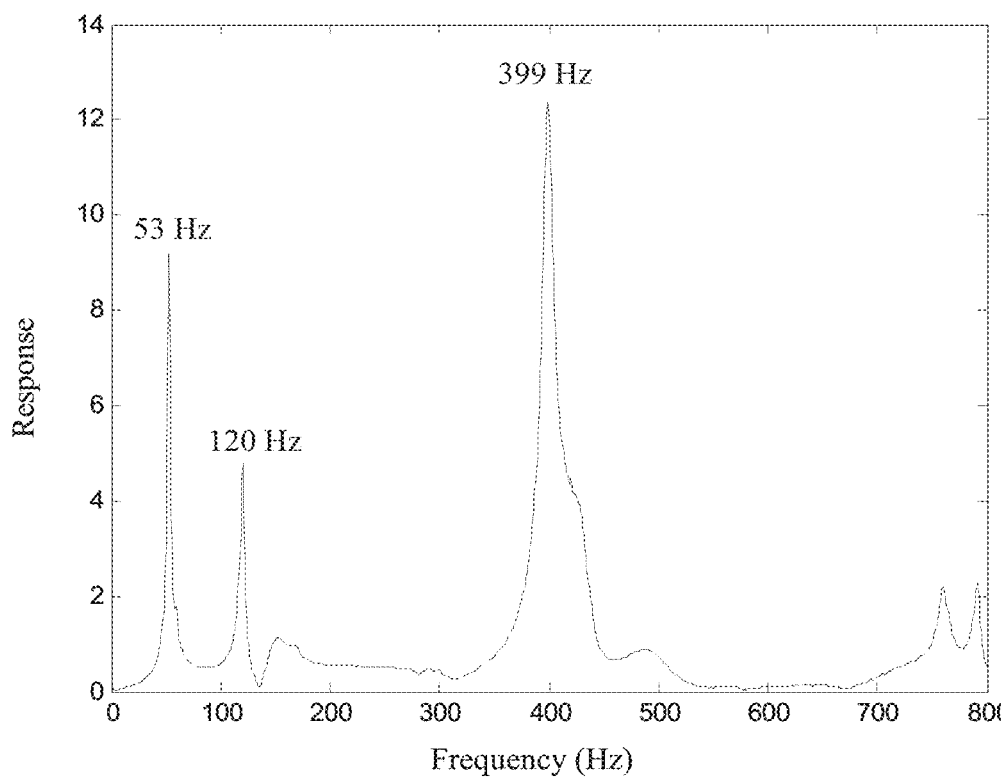
FIG. 3 illustrates the vibration response of the test vehicle that has a four-point support.

First, an appropriate random vibration frequency range covers the natural frequency of test vehicles so that the test samples have the maximum vibration response. Therefore, natural frequency measurement is important to vibration test design. FIG. 3 shows the frequency response of single sided insertion mount assemblies with 4-point support on the vibration shaker. The first mode natural frequency of the assembly is 53 Hz. The designed vibration frequency range, 40-500 Hz, satisfies the natural frequency coverage requirement. Therefore, this frequency range was used in all the tests.

Figure 4:
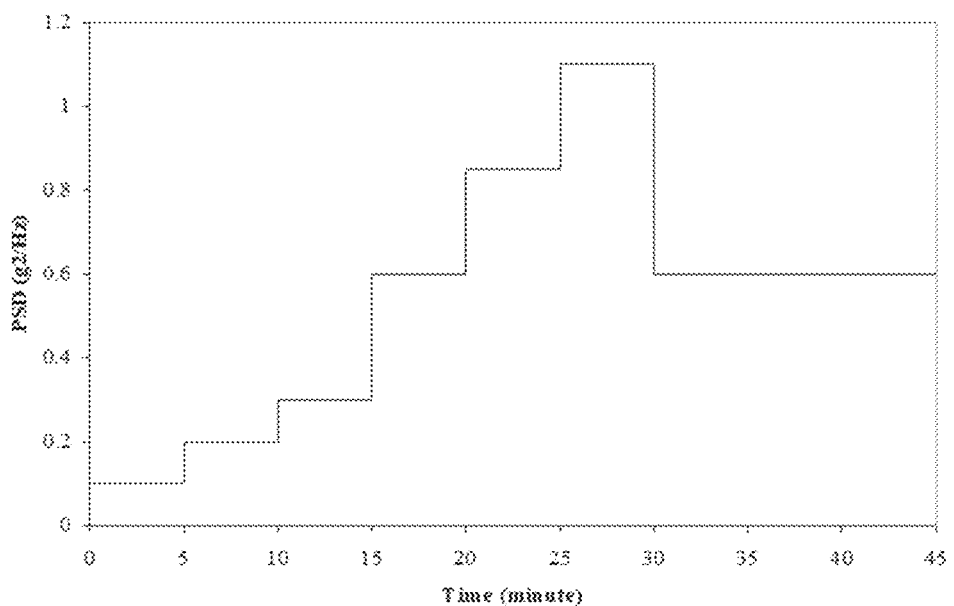
FIG. 4 shows a step stress loading plot used in measuring overstress limit of the test vehicle.

The focus of overstress limit determination was the high cycle fatigue failure mechanism of solder joint. Therefore, the applied vibration stress shall not cause other failure mechanisms, such as overstress failure. To determine the overstress limit for test vehicles, step stress test was first carried out on the SnPb/HASL assembly with a different boundary condition: two clamps supporting the short-edges of the board. The stress loading history is shown in FIG. 4. PSD level was stepped up from 0.1, 0.2, 0.3, 0.6, 0.85, 1.1 G$^2$/Hz with 5 minutes dwell at each level. There were no failures observed. Then PSD level was dropped to 0.6 G$^2$/Hz for 15 minutes vibration-test. Components then started to fail at the 14$^{th}$ minute and all components failed at the end of 15 minutes of vibration exposure.

Another test was set for the SAC/OSP assembly. The vibration loading was kept at 0.6 G$^2$/Hz and all components failed after 21 minutes vibration exposure. For the boundary condition to be used in this study, e.g., four-point support, it is expected that 0.6 G$^2$/Hz will cause the components to fail faster due to the lower natural frequency associated with this boundary condition. Therefore, 0.6 G$^2$/Hz was considered as overstress limit for single sided insertion mount assemblies in the study. No stress level should be set beyond 0.6 G$^2$/Hz.

Figure 5:
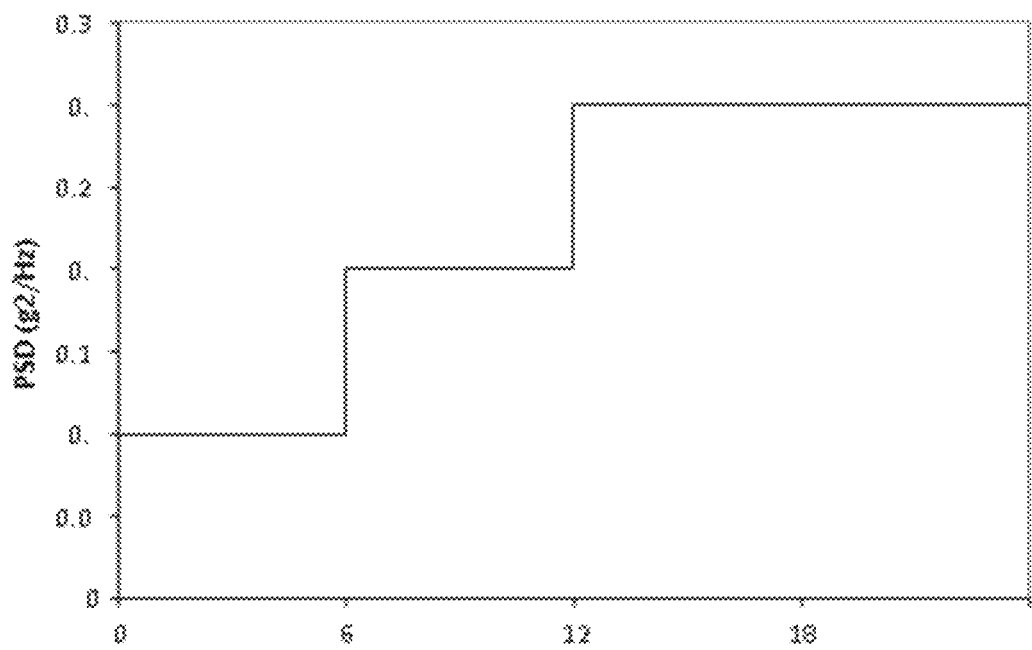
FIG. 5 shows a step stress loading plot used in assessing reliability of the electronic components.

The step stress chosen for vibration loading was set to 0.1, 0.2, and 0.3 G$^2$/Hz with 6 hours exposure time at each level. If all components do not fail at the end of the test, another 6 hours of vibration exposure would be continued at 0.3 G$^2$/Hz PSD level. The PSD history is shown in FIG. 5.

The durability vibration tests were carried out after the natural frequency of the test vehicle, the overstress limit, and the step stress profile have been determined. Both the effect of aging conditions and the effect of vibration loading were investigated as they influenced the performance of the different assemblies depending on the board pad finish and solder material.

Aging Temperature Effects on SAC/ImSn Assembly Durability Under Step Stress

Figure 6:
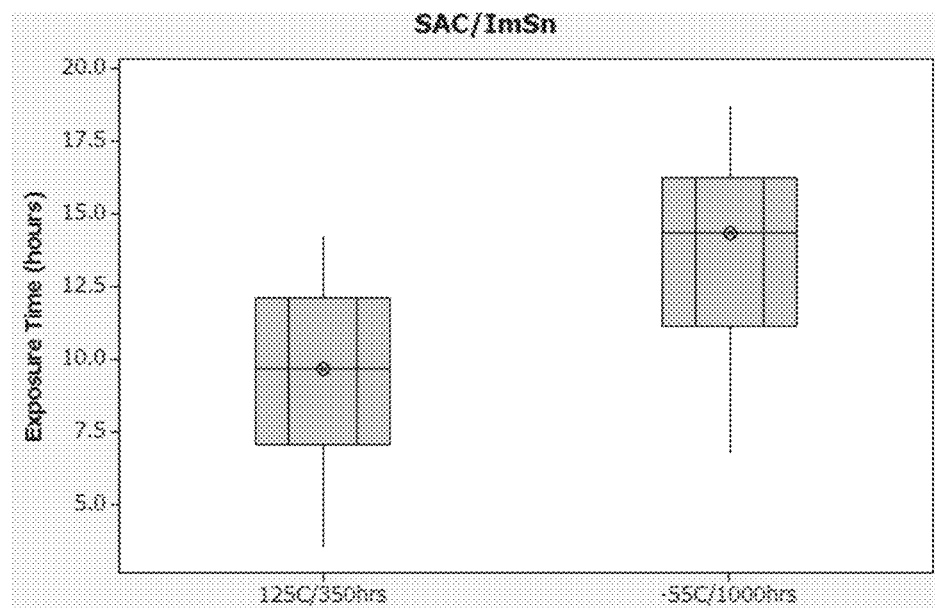
FIG. 6 illustrates test results for SAC/ImSn assemblies under two different aging conditions, namely at 125° C. for 350 hours and at −55° C. for 1000 hours.

Two SAC/ImSn assemblies aged at different temperatures were subjected to step stress tests. One was aged at −55° C. for 1000 hours and another at 125° C. for 350 hours. The test results shown in FIG. 6 clearly indicate that the high temperature aging decreases the solder joint fatigue life under a random vibration loading. Test results between these two assemblies show similarities in the spread of the data as the maximum and the minimum values are separated almost equally. However, the calculated means shows a large difference in the mean of the time to failure of the SAC/ImSn assembly when subjected to different aging conditions: −55° C./1000 hr ($\mu$=13.72 hrs)>125° C./350 hr ($\mu$=9.54 hrs)

Aging Effects on SnPb/HASL Assembly Durability Under Step Stress

Figure 7:
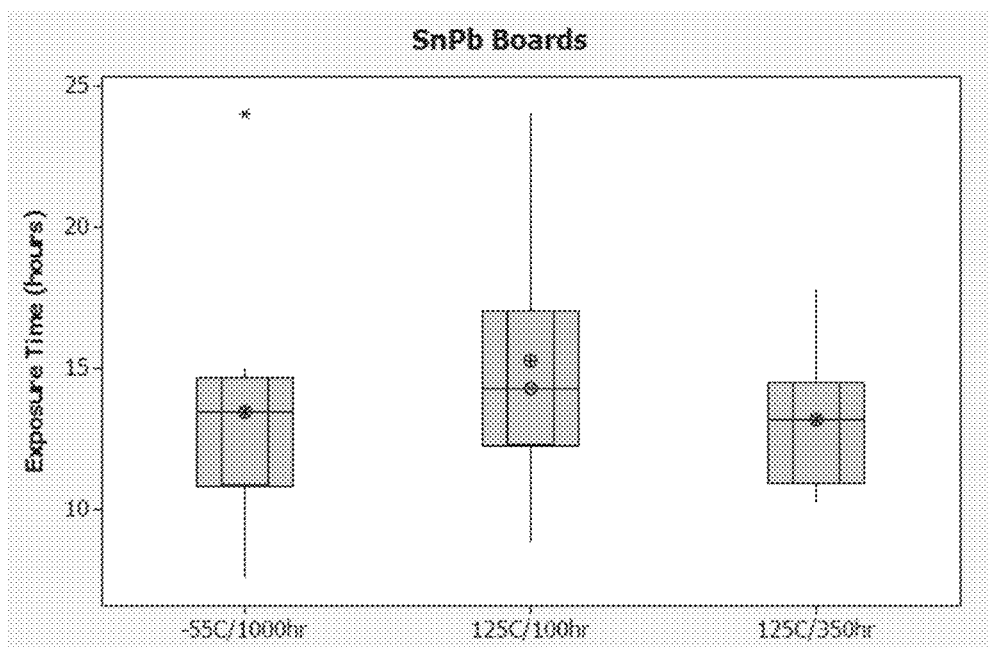
FIG. 7 illustrates test results for SnPb/HASL assemblies under three aging conditions, namely at −55° C. for 1000 hours, at 125° C. for 100 hours, and at 125° C. for 350 hours.
Figure 8:
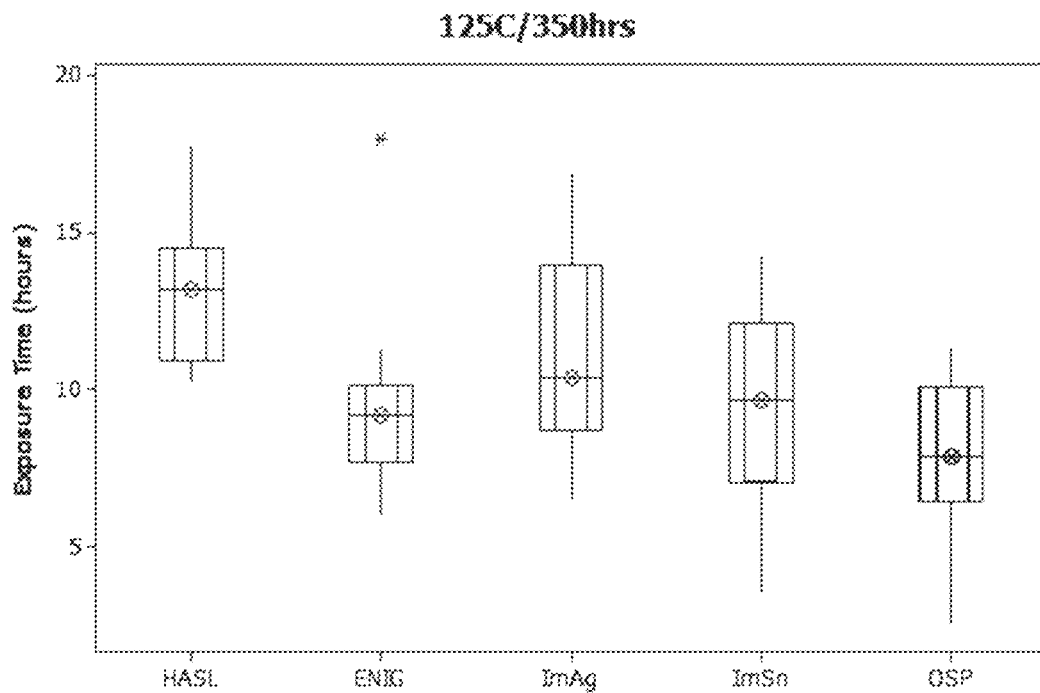
FIG. 8 illustrates test results for SnPb and SAC assemblies aged at 120° C. for 350 hours.

Three aged SnPb/HASL assemblies were subjected to step stress tests. One was aged at −55° C. for 1000 hours, one at 125° C. for 100 hours, and another at 125° C. for 350 hours. FIG. 7 shows a box plot with the test results under these three aging conditions. Different from the observations in the SAC test, SnPb test results did not clearly show the monotonic decreasing life trend while both aging temperature increased and aging time increased. It was observed at high temperature aging (125° C.) the life decreased while aging time extended, which is consistent with SAC performance. On the other hand, it was found the SnPb durability after 100 aging hours at 125° C. was better than the durability after 1000 hours at −55° C. The test results indicate that the SnPb reliability will be affected not only high temperature aging, but also low temperature aging.

Durability Comparison Between Aged SnPb and SAC Assemblies

Aged SnPb and SAC assemblies with different PCB pad finishes were tested under a step stress condition. Aging temperature was 125° C. and duration was 350 hours. FIG.

8 shows the test results plotted in a box plot. The results show the SnPb/HASL assembly has slightly better durability than any of the SAC assemblies. The test results also showed PCB pad finish does affect the aged assembly performance. It can be seen that ImAg has the best durability and OSP has the worst durability among the SAC assemblies.

Durability Comparison Between SnPb/HASL and SAC/ImSn

Figure 9:
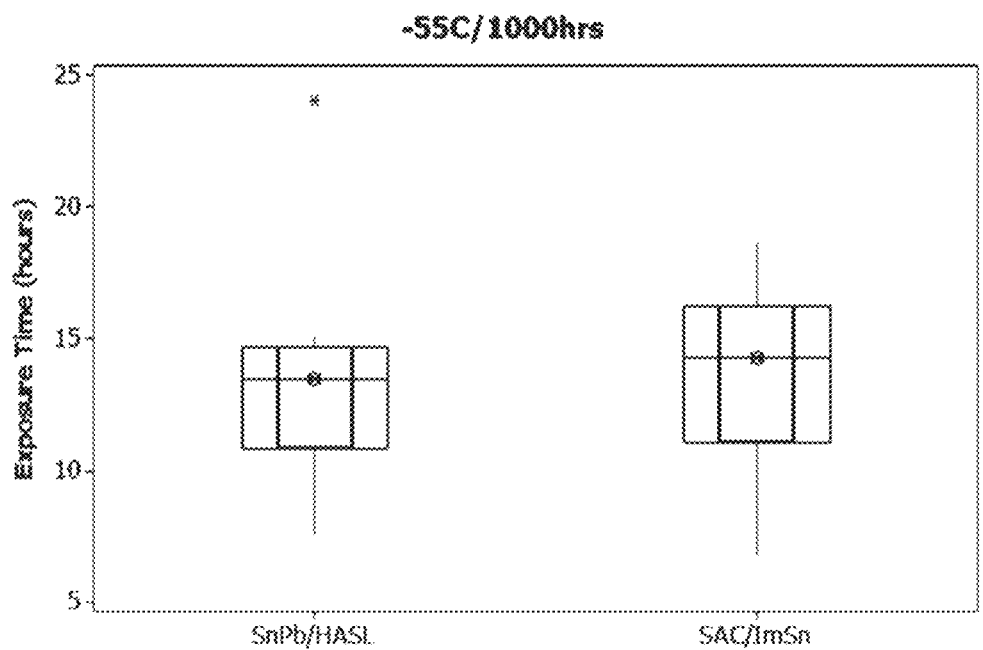
FIG. 9 illustrates test results for SnPb and SAC assemblies aged at −50° C. for 1000 hours.

Another comparison between equally aged SnPb and SAC assemblies with different PCB pad finishes is shown in FIG. 9. Here, SnPb/HASL is compared to SAC/ImSn subjected to the same aging condition of temperature −55° C. and duration was 1000 hours. The plot shows SnPb/HASL and SAC/ImSn assemblies have comparable results under this aging condition while the calculated mean of time-to-failure for both components are $\mu=13.72$ hrs (SAC/ImSn) and $\mu=13.45$ hrs (SnPb/HASL).

Failure Analysis

Figure 10:
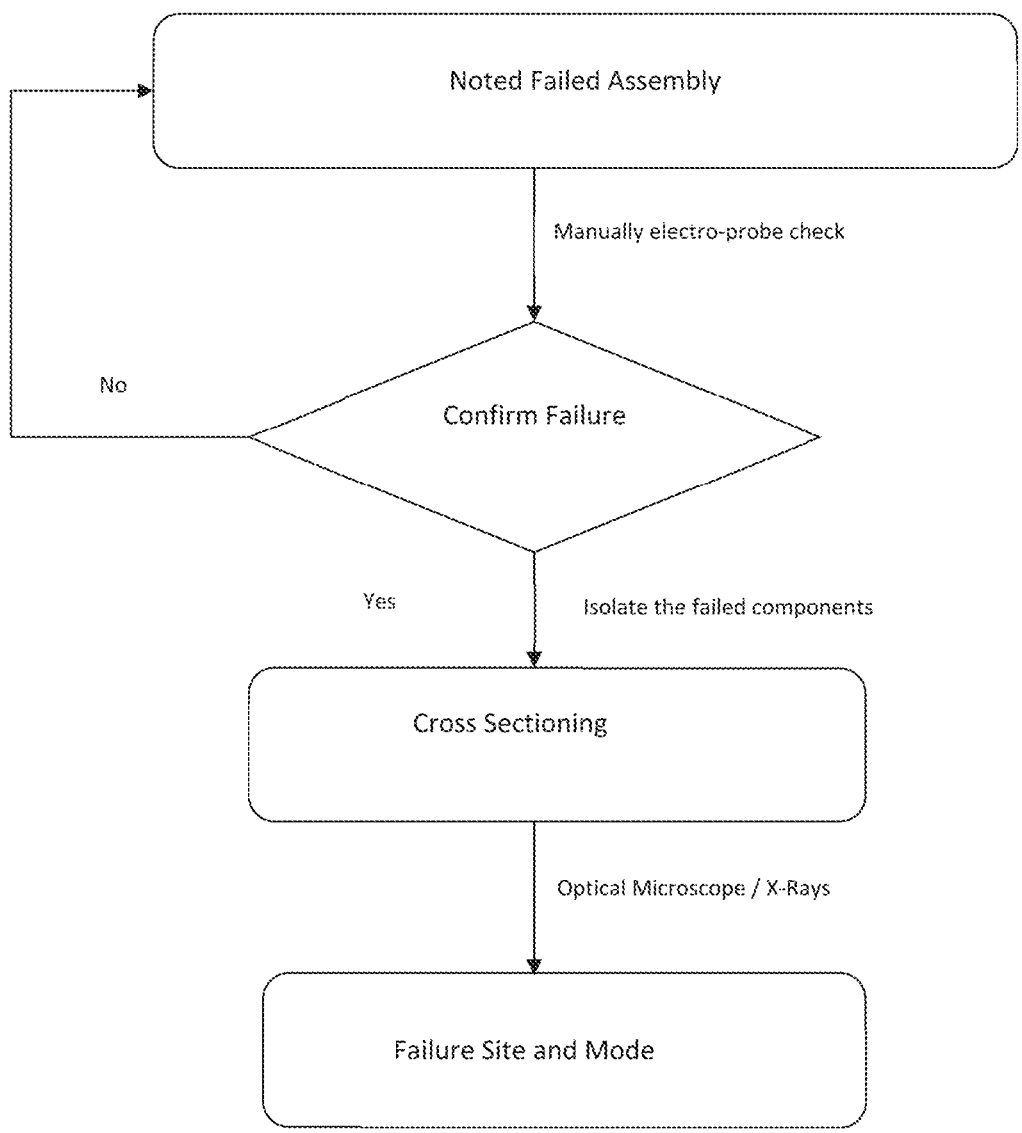
FIG. 10 is a flow chart for the process in failure analysis of the failed electronic components.

Failure analysis was performed on the failed parts after the test. In one embodiment, the failure analysis included three steps, which are shown in the flow chart in FIG. 10. The first step is to manually check the electrical resistance of each daisy chain while there is no load applied. The second step is to cut the failed components from the board and finally perform cross sectioning. The cross-sectioned of the failed component is then examined using a range of analytic tools and techniques, including optical microscope, X-ray, SEM, elemental analysis, etc.

After performing failure analysis on failed components, different failure modes have been observed. The observed failures included: lead wire fracture, intermetallic solder-to-board pad separation, pad-to-board separation, board trace, etc. Among these failures, lead wire fractures appeared to be the most common ones. Nine out of twelve failures that have been identified after cross sectioning were due to lead wire fractures. The fractures indicated that the vibration caused a shear stress in the interface between the board and the component.

Figure 11:
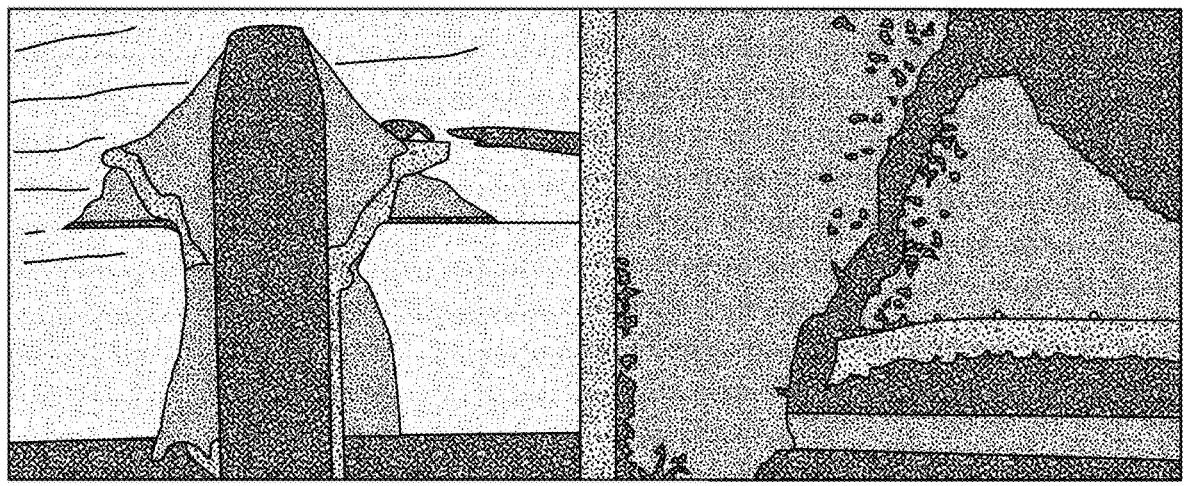
FIG. 11 shows two micrographs of failed SnPb and SAC assemblies aged at −55° C. for 1000 hours.

Failure of the solder joint in electronic products arose either when individual events exceed the strength of the solder joint or when the accumulation of damage due to cycling loading exceeds its fatigue strength. On thermally induced fatigue, a commonly seen failure is the fatigue cracking where 45° angle fractures propagate along the solder joint, as shown in FIG. 11. These fractures extended from the root of the solder fillet through the solder bulk.

Figure 12:
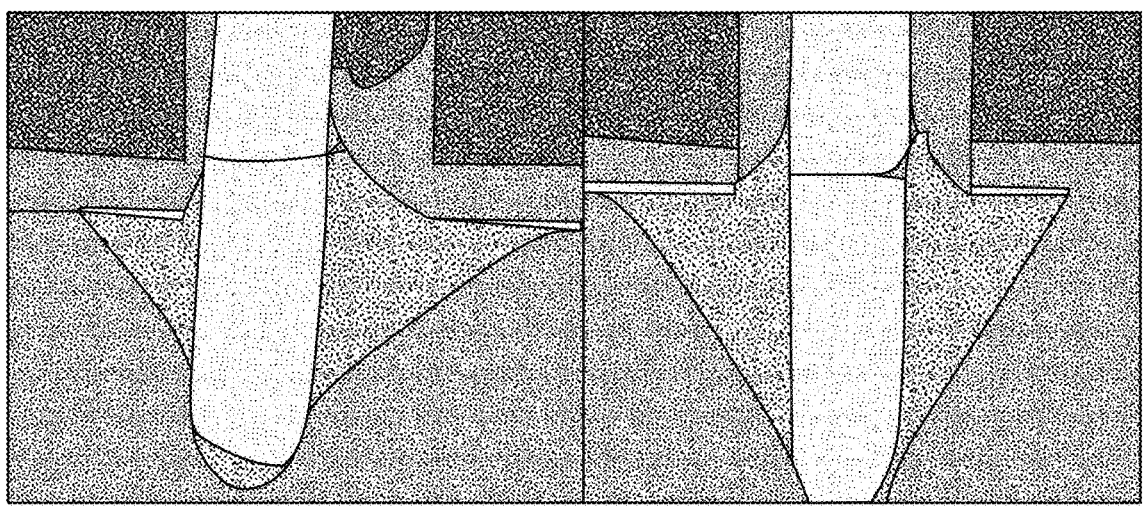
FIG. 12 are pictures showing fractured lead wires of the PDIP.

FIG. 12 shows two different cases in which the lead wire of the PDIP fractured. In most cases the failure was located in the pin just above the bottom surface of the board (about 1 or 2 mm). Also, these failures were found in either or both of the leads that are closer to the center line of the board. This area of the board is where the largest curvature displacement was found during the vibration loading. In fact, 78% of the failures have been found in this location.

The assembly characteristics for these two assemblies are SAC/ImSn—(aging condition: 125° C. for 100 hours) and SAC/ImSn—(aging condition: −55° C. for 1000 hours).

Figure 13:
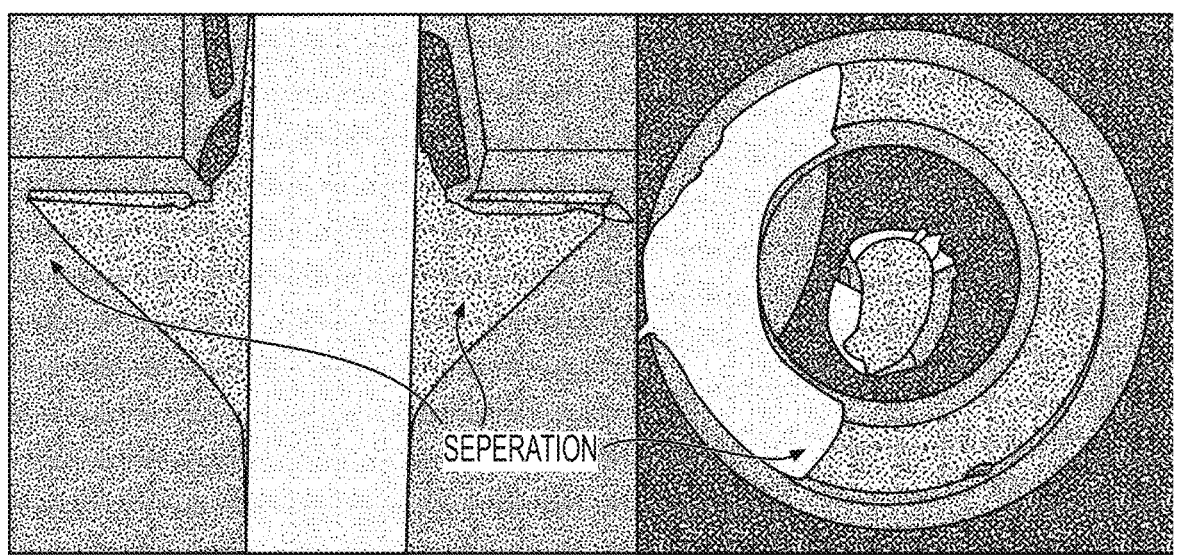
FIG. 13 are pictures showing separation between the solder and the board pad.

FIG. 13 shows crack/separation between the solder and the board pad (left) and separation between the pad and the board (right). Both of these failures were also found at pins located closer to the center line of the board. In the left picture, it is clear that the separation is found at the intermetallic. The solder material and board finish (in case of Pb-free assemblies) could have an influence in occurrence of this failure.

Test results show SAC solder joint performance is sensitive to the aging temperature and duration. While the aging temperature and duration increased, SAC solder joints could significantly reduce their performance under vibration loading conditions. Preliminary results show that ImAg pad finish performed the best among all SAC assemblies followed by ImSn and ENIG while OSP had the worst performance of all. On the other hand, the performance of SnPb/HASL assemblies appears to be less sensitive or dependent to the temperature and duration conditionings.

Failure induced by thermal cycling loading is believe to generate a different failure mode than vibration loading. While thermal cycling produces 45 degree cracks in the bulk of the solder, vibration loading produces separation in the interface between the pad and the solder as well as pin cracks.

In general, SnPb solder joint durability performance is better than SAC solder joint. Thermal aging of SAC solder joints can significantly reduce their reliability under vibration loading. Although this does not mean that lead-free solders cannot be used in high reliability electronics, it does imply that models for calculating the actual field lifetime of lead-free solder joints on insertion mount components will need to be developed and validated using actual vibration test data. This study provides the fundamentals for the models development. These models can then be used to verify and predict that electronics made with lead-free solders will survive for the required lifetime in the oil and gas drilling services applications.

Lab Tests

Figure 14:
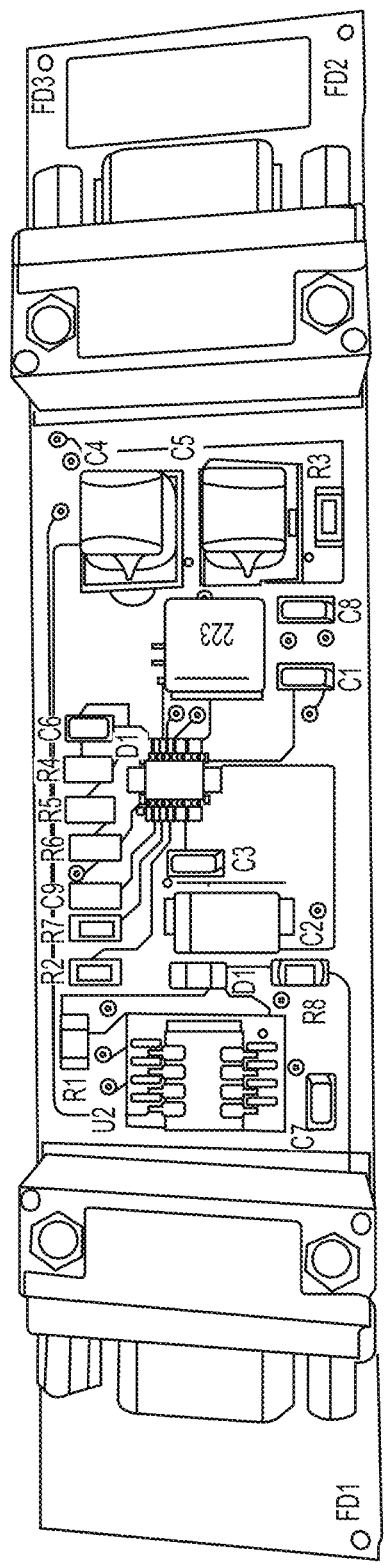
FIG. 14 is a picture of the PCBA of the current disclosure for being tested for durability.
Figure 15:
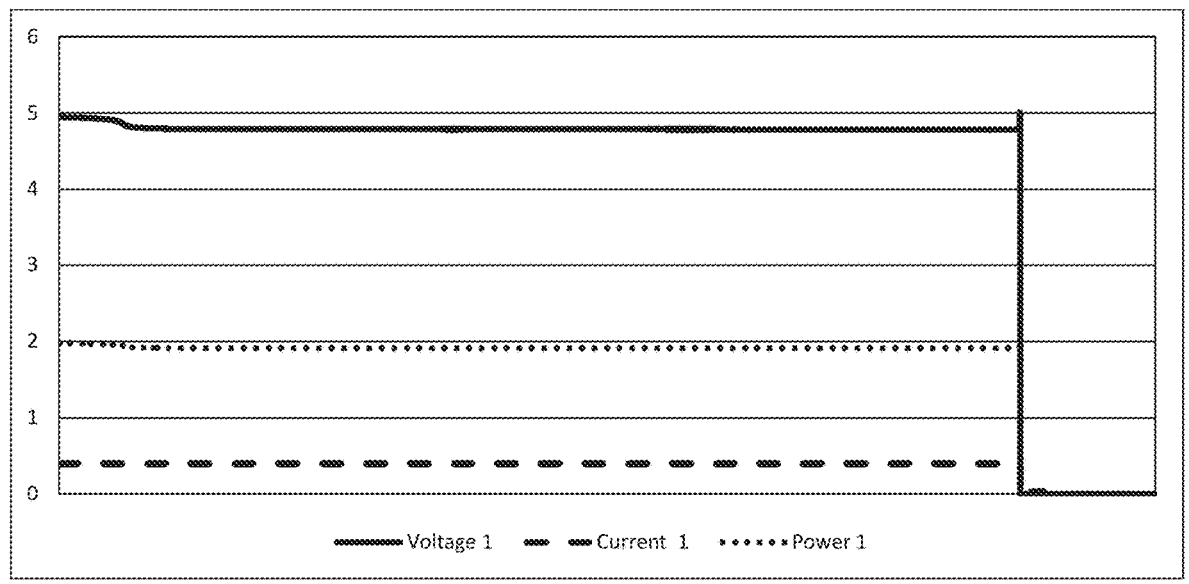
FIG. 15 is a plot showing data at the end of the durability test of the PCBA at 175° C.

A PCBA of the disclosure was tested at 200° C. for high temperature survivability. FIG. 14 is a picture of the tested PCBA. It is connected with a load box set for 5 VDC at 400 mA. LabVIEW was used to control and log data from the power supply. The PCBA was tested continuously for 797 hours at 200° C. in an oven before it failed to meet the requirements set on the load box. FIG. 15 shows data from the last week of testing, indicating a sudden drop of voltage after being in the oven at 200° C. after a cumulative 797 hours.

In addition, a directional drilling module equipped with PCBs of the current disclosure and a plurality of sensors (azimuth, inclination, total H field, total G field, dip angle, etc.) successfully passed a series of tests designed to test the performance in downhole conditions.

In the vibration test, the random vibrations of 20 $G_{rms}$ were applied to the directional drilling module at 175° C. Table 6 compare the shift in sensor signals before and after the tests. Minor shifts were observed but the results were within the specification.

TABLE 6

| 175° C. | | Inc | Before Temp&Vib | After Temp&Vib | Shift |
|---|---|---|---|---|---|
| Azimuth spread [deg] | North | 90 | 0.132 | 0.285 | 0.152 |
| | | 45 | 0.167 | 0.358 | 0.191 |
| | | 10 | 0.072 | 0.293 | 0.221 |
| | | 5 | 0.401 | 0.591 | 0.19 |
| | West | 90 | 0.172 | 0.236 | 0.064 |
| | | 45 | 0.126 | 0.228 | 0.103 |
| | | 10 | 0.31 | 0.352 | 0.042 |
| | | 5 | 0.709 | 0.531 | −0.179 |
| Inclination spread [deg] | North | 90 | 0.038 | 0.078 | 0.04 |
| | | 45 | 0.023 | 0.047 | 0.024 |
| | | 10 | 0.017 | 0.044 | 0.027 |
| | | 5 | 0.023 | 0.043 | 0.02 |
| | West | 90 | 0.04 | 0.085 | 0.045 |
| | | 45 | 0.036 | 0.054 | 0.018 |
| | | 10 | 0.034 | 0.046 | 0.013 |
| | | 5 | 0.036 | 0.047 | 0.011 |

TABLE 6-continued

| 175° C. | | Inc | Before Temp&Vib | After Temp&Vib | Shift |
|---|---|---|---|---|---|
| Total H field spread [nT] | North | 90 | 50.4 | 88.8 | 38.4 |
| | | 45 | 6.8 | 16.5 | 9.7 |
| | | 10 | 23.8 | 79.6 | 55.8 |
| | | 5 | 15.9 | 82.7 | 66.8 |
| | West | 90 | 39.2 | 129.7 | 90.5 |
| | | 45 | 38.3 | 107.4 | 69.1 |
| | | 10 | 21.7 | 89.9 | 68.2 |
| | | 5 | 25.6 | 88.2 | 62.6 |
| | Total | | 50.4 | 152.5 | 102.1 |
| Total g field spread [mG] | North | 90 | 0.28 | 1.5 | 1.22 |
| | | 45 | 0.4 | 1.17 | 0.77 |
| | | 10 | 0.26 | 0.28 | 0.01 |
| | | 5 | 0.18 | 0.19 | 0.01 |
| | West | 90 | 0.64 | 1.39 | 0.75 |
| | | 45 | 0.48 | 1.24 | 0.76 |
| | | 10 | 0.13 | 0.3 | 0.18 |
| | | 5 | 0.07 | 0.1 | 0.03 |
| | Total | | 1.36 | 1.92 | 0.56 |
| Dip Angle spread [deg] | North | 90 | 0.083 | 0.257 | 0.173 |
| | | 45 | 0.078 | 0.278 | 0.199 |
| | | 10 | 0.067 | 0.244 | 0.177 |
| | | 5 | 0.061 | 0.238 | 0.177 |
| | West | 90 | 0.073 | 0.143 | 0.069 |
| | | 45 | 0.113 | 0.241 | 0.128 |
| | | 10 | 0.147 | 0.247 | 0.1 |
| | | 5 | 0.12 | 0.246 | 0.127 |
| | Total | | 0.179 | 0.349 | 0.17 |

In the shock tests, the magnitude of the shocks was 500 G. Each shock was applied as half-sine wave at a duration of 1 ms each in six different directions (i.e., +X, −X, +Y, −Y, +Z, −Z) for 10 shocks in each direction. The PCBA was powered during the shock tests. The shock tests were carried out at room temperature, 150° C., and 175° C., respectively. Table 7 shows the results from various sensors before and after the shock tests at 175° C.

TABLE 7

| 175° C. | | Inc | Before Shock | After Shock | Shift |
|---|---|---|---|---|---|
| Azimuth spread [deg] | North | 90 | 0.1 | 0.122 | 0.022 |
| | | 45 | 0.075 | 0.171 | 0.096 |

TABLE 7-continued

| 175° C. | | Inc | Before Shock | After Shock | Shift |
|---|---|---|---|---|---|
| | | 10 | 0.46 | 0.68 | 0.22 |
| | | 5 | 0.998 | 1.102 | 0.104 |
| | West | 90 | 0.065 | 0.035 | −0.03 |
| | | 45 | 0.132 | 0.103 | −0.029 |
| | | 10 | 0.509 | 0.568 | 0.059 |
| | | 5 | 1.047 | 1.158 | 0.111 |
| Inclination spread [deg] | North | 90 | 0.017 | 0.027 | 0.01 |
| | | 45 | 0.062 | 0.074 | 0.011 |
| | | 10 | 0.088 | 0.106 | 0.018 |
| | | 5 | 0.093 | 0.096 | 0.003 |
| | West | 90 | 0.014 | 0.033 | 0.018 |
| | | 45 | 0.078 | 0.068 | −0.01 |
| | | 10 | 0.098 | 0.103 | 0.005 |
| | | 5 | 0.099 | 0.101 | 0.002 |
| Total H field spread [nT] | North | 90 | 36.9 | 94.5 | 57.6 |
| | | 45 | 10.1 | 63.1 | 53 |
| | | 10 | 13.6 | 57.4 | 43.8 |
| | | 5 | 17.9 | 59.4 | 41.5 |
| | West | 90 | 48.6 | 118.7 | 70.1 |
| | | 45 | 36.1 | 92.6 | 56.5 |
| | | 10 | 25.5 | 57.3 | 31.8 |
| | | 5 | 26 | 67.9 | 41.9 |
| | Total | | 48.6 | 140.1 | 91.5 |
| Total g field spread [mG] | North | 90 | 1.51 | 1.75 | 0.24 |
| | | 45 | 1.09 | 1.21 | 0.12 |
| | | 10 | 0.29 | 0.35 | 0.06 |
| | | 5 | 0.3 | 0.18 | −0.12 |
| | West | 90 | 1.77 | 1.78 | 0.01 |
| | | 45 | 1.26 | 1.22 | −0.04 |
| | | 10 | 0.23 | 0.33 | 0.1 |
| | | 5 | 0.12 | 0.16 | 0.04 |
| | Total | | 1.89 | 1.92 | 0.03 |
| Dip Angle spread [deg] | North | 90 | 0.051 | 0.128 | 0.077 |
| | | 45 | 0.035 | 0.107 | 0.072 |
| | | 10 | 0.045 | 0.028 | −0.017 |
| | | 5 | 0.045 | 0.035 | −0.01 |
| | West | 90 | 0.069 | 0.089 | 0.02 |
| | | 45 | 0.066 | 0.069 | 0.003 |
| | | 10 | 0.055 | 0.05 | −0.006 |
| | | 5 | 0.052 | 0.04 | −0.012 |
| | Total | | 0.086 | 0.172 | 0.086 |

Extended roll tests at different temperatures were also carried out. Table 8 shows data from roll tests of the directional module at 175° C. for a cumulative 1000 hours.

TABLE 8

| | | | Roll Test Data | | | | Shift from 0 h data | | |
|---|---|---|---|---|---|---|---|---|---|
| 175° C. | | Inc | 0 h | 200 h | 493 h | 1000 h | 200 h | 493 h | 1000 h |
| Azimuth spread [deg] | North | 90 | 0.137 | 0.203 | 0.196 | 0.223 | 0.066 | 0.06 | 0.087 |
| | | 45 | 0.045 | 0.081 | 0.106 | 0.093 | 0.036 | 0.061 | 0.048 |
| | | 10 | 0.501 | 0.793 | 0.877 | 0.737 | 0.292 | 0.376 | 0.236 |
| | | 5 | 1.178 | 1.886 | 1.783 | 1.866 | 0.707 | 0.604 | 0.688 |
| | West | 90 | 0.066 | 0.059 | 0.048 | 0.078 | −0.007 | −0.018 | 0.012 |
| | | 45 | 0.059 | 0.194 | 0.258 | 0.246 | 0.136 | 0.199 | 0.187 |
| | | 10 | 0.571 | 0.891 | 0.969 | 0.955 | 0.32 | 0.398 | 0.384 |
| | | 5 | 1.134 | 1.828 | 1.647 | 1.581 | 0.695 | 0.514 | 0.447 |
| Inclination spread [deg] | North | 90 | 0.027 | 0.015 | 0.021 | 0.022 | −0.012 | −0.006 | −0.005 |
| | | 45 | 0.07 | 0.113 | 0.116 | 0.103 | 0.042 | 0.046 | 0.032 |
| | | 10 | 0.097 | 0.152 | 0.16 | 0.148 | 0.055 | 0.063 | 0.051 |
| | | 5 | 0.103 | 0.158 | 0.162 | 0.131 | 0.055 | 0.059 | 0.028 |
| | West | 90 | 0.015 | 0.012 | 0.023 | 0.029 | −0.003 | 0.008 | 0.014 |
| | | 45 | 0.082 | 0.119 | 0.113 | 0.105 | 0.037 | 0.031 | 0.023 |
| | | 10 | 0.109 | 0.157 | 0.162 | 0.141 | 0.047 | 0.053 | 0.032 |
| | | 5 | 0.117 | 0.163 | 0.164 | 0.13 | 0.046 | 0.047 | 0.013 |
| Total H field spread [nT] | North | 90 | 22.3 | 53.5 | 45.8 | 41.8 | 31.2 | 23.5 | 19.5 |
| | | 45 | 4.3 | 45.5 | 68 | 17.9 | 41.2 | 63.7 | 13.6 |
| | | 10 | 13.9 | 21.5 | 43 | 30.4 | 7.6 | 29.1 | 16.5 |
| | | 5 | 16.2 | 29 | 32.5 | 37.5 | 12.8 | 16.3 | 21.3 |

TABLE 8-continued

| 175° C. | | Inc | Roll Test Data | | | | Shift from 0 h data | | |
|---|---|---|---|---|---|---|---|---|---|
| | | | 0 h | 200 h | 493 h | 1000 h | 200 h | 493 h | 1000 h |
| | West | 90 | 25.9 | 74.5 | 48.2 | 56.2 | 48.6 | 22.3 | 30.3 |
| | | 45 | 17.7 | 48.2 | 65.7 | 62.6 | 30.5 | 48 | 44.9 |
| | | 10 | 8.2 | 58.7 | 40.3 | 64.2 | 50.5 | 32.1 | 56 |
| | | 5 | 10.9 | 21.1 | 55.6 | 58.2 | 10.2 | 44.7 | 47.3 |
| | Total | | 45.1 | 82.7 | 104.2 | 99.2 | 37.6 | 59.1 | 54.1 |
| Total g field spread [mG] | North | 90 | 1.44 | 2.24 | 2.05 | 2.46 | 0.81 | 0.62 | 1.02 |
| | | 45 | 1.32 | 1.99 | 1.87 | 1.76 | 0.67 | 0.56 | 0.44 |
| | | 10 | 0.19 | 0.31 | 0.4 | 0.39 | 0.12 | 0.21 | 0.2 |
| | | 5 | 0.08 | 0.16 | 0.16 | 0.17 | 0.08 | 0.07 | 0.09 |
| | West | 90 | 1.37 | 2.21 | 2.3 | 2.36 | 0.84 | 0.93 | 0.98 |
| | | 45 | 1.38 | 1.98 | 1.94 | 1.75 | 0.6 | 0.56 | 0.37 |
| | | 10 | 0.21 | 0.67 | 0.43 | 0.44 | 0.46 | 0.22 | 0.23 |
| | | 5 | 0.13 | 0.29 | 0.2 | 0.19 | 0.16 | 0.07 | 0.06 |
| | Total | | 1.87 | 2.44 | 2.49 | 2.48 | 0.57 | 0.62 | 0.6 |
| Dip Angle spread [deg] | North | 90 | 0.038 | 0.047 | 0.032 | 0.047 | 0.008 | −0.006 | 0.009 |
| | | 45 | 0.075 | 0.132 | 0.176 | 0.132 | 0.057 | 0.101 | 0.058 |
| | | 10 | 0.133 | 0.2 | 0.193 | 0.17 | 0.067 | 0.061 | 0.037 |
| | | 5 | 0.143 | 0.206 | 0.162 | 0.182 | 0.063 | 0.018 | 0.039 |
| | West | 90 | 0.205 | 0.224 | 0.207 | 0.191 | 0.019 | 0.002 | −0.014 |
| | | 45 | 0.121 | 0.184 | 0.188 | 0.206 | 0.063 | 0.067 | 0.085 |
| | | 10 | 0.091 | 0.154 | 0.173 | 0.193 | 0.062 | 0.082 | 0.101 |
| | | 5 | 0.118 | 0.19 | 0.17 | 0.187 | 0.073 | 0.052 | 0.069 |
| | Total | | 0.205 | 0.24 | 0.227 | 0.233 | 0.035 | 0.022 | 0.028 |

In the temperature cycle tests, fifty temperature cycles of the directional module were carried out from room temperature to 175° C. The results are shown in Table 9.

TABLE 9

| 175° C. | | Inc | Roll Test Data | | | Shift from 0 cycle data | |
|---|---|---|---|---|---|---|---|
| | | | 0 cycle | 50 cycle | 100 cycle | 50 cycle | 100 cycle |
| Azimuth spread [deg] | North | 90 | 0.173 | 0.144 | 0.174 | −0.029 | 0.001 |
| | | 45 | 0.124 | 0.105 | 0.071 | −0.019 | −0.052 |
| | | 10 | 0.106 | 0.247 | 0.515 | 0.141 | 0.409 |
| | | 5 | 0.416 | 0.743 | 1.263 | 0.327 | 0.847 |
| | West | 90 | 0.05 | 0.089 | 0.093 | 0.039 | 0.043 |
| | | 45 | 0.064 | 0.133 | 0.13 | 0.069 | 0.066 |
| | | 10 | 0.212 | 0.438 | 0.639 | 0.226 | 0.427 |
| | | 5 | 0.436 | 0.797 | 1.606 | 0.361 | 1.171 |
| Inclination spread [deg] | North | 90 | 0.012 | 0.03 | 0.023 | 0.018 | 0.012 |
| | | 45 | 0.025 | 0.074 | 0.095 | 0.049 | 0.07 |
| | | 10 | 0.026 | 0.061 | 0.104 | 0.034 | 0.078 |
| | | 5 | 0.03 | 0.076 | 0.105 | 0.045 | 0.074 |
| | West | 90 | 0.019 | 0.022 | 0.032 | 0.003 | 0.013 |
| | | 45 | 0.03 | 0.08 | 0.081 | 0.05 | 0.051 |
| | | 10 | 0.033 | 0.074 | 0.116 | 0.04 | 0.083 |
| | | 5 | 0.029 | 0.07 | 0.109 | 0.041 | 0.08 |
| Total H field spread [nT] | North | 90 | 23 | 38.9 | 33.3 | 15.9 | 10.3 |
| | | 45 | 34.5 | 27.6 | 21.5 | −6.9 | −13 |
| | | 10 | 18.8 | 39.6 | 33.4 | 20.8 | 14.6 |
| | | 5 | 8.6 | 45.8 | 54.2 | 37.2 | 45.6 |
| | West | 90 | 10.5 | 62.2 | 31.1 | 51.7 | 20.6 |
| | | 45 | 10.5 | 27.6 | 65.7 | 17.1 | 55.2 |
| | | 10 | 18.6 | 40.6 | 42.4 | 22 | 23.8 |
| | | 5 | 5.1 | 25.2 | 51.2 | 20.1 | 46.1 |
| | Total | | 65 | 65.4 | 72 | 0.4 | 7 |
| Total g field spread [mG] | North | 90 | 0.61 | 1.11 | 1.67 | 0.5 | 1.06 |
| | | 45 | 0.44 | 0.66 | 1.14 | 0.22 | 0.7 |
| | | 10 | 0.17 | 0.14 | 0.3 | −0.03 | 0.13 |
| | | 5 | 0.14 | 0.05 | 0.1 | −0.08 | −0.04 |
| | West | 90 | 0.57 | 1.13 | 1.68 | 0.56 | 1.11 |
| | | 45 | 0.43 | 0.74 | 1.05 | 0.31 | 0.62 |
| | | 10 | 0.12 | 0.22 | 0.24 | 0.09 | 0.12 |
| | | 5 | 0.14 | 0.06 | 0.11 | −0.08 | −0.03 |
| | Total | | 0.98 | 1.25 | 1.85 | 0.26 | 0.87 |
| Dip Angle spread [deg] | North | 90 | 0.033 | 0.082 | 0.076 | 0.049 | 0.044 |
| | | 45 | 0.06 | 0.135 | 0.117 | 0.074 | 0.057 |
| | | 10 | 0.045 | 0.105 | 0.143 | 0.06 | 0.097 |
| | | 5 | 0.045 | 0.113 | 0.137 | 0.068 | 0.091 |
| | West | 90 | 0.066 | 0.079 | 0.114 | 0.012 | 0.047 |
| | | 45 | 0.036 | 0.116 | 0.175 | 0.08 | 0.139 |
| | | 10 | 0.08 | 0.111 | 0.126 | 0.031 | 0.045 |
| | | 5 | 0.067 | 0.136 | 0.13 | 0.069 | 0.062 |
| | Total | | 0.111 | 0.148 | 0.197 | 0.037 | 0.086 |

Field Tests

Figure 16:
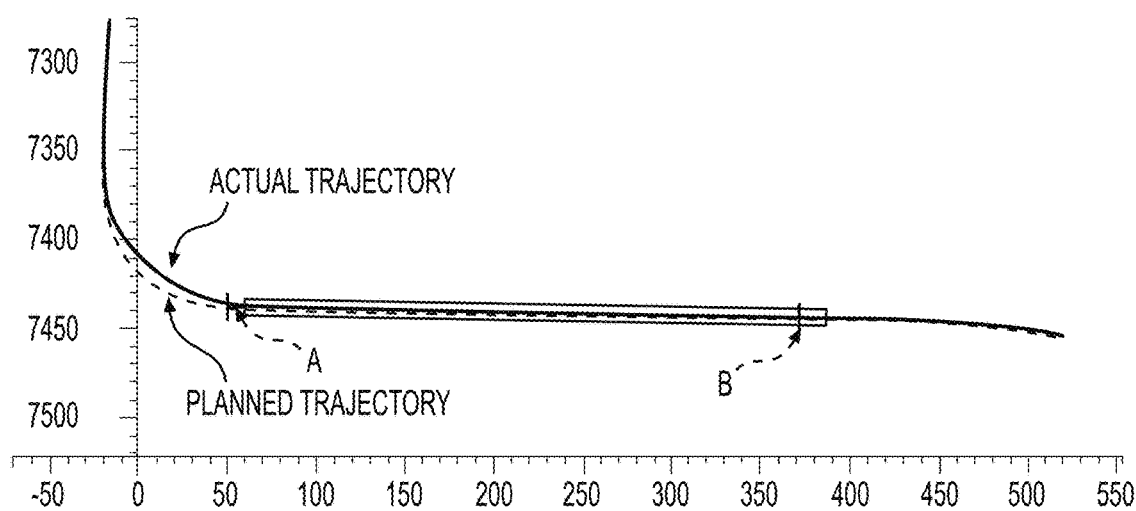
FIG. 16 shows a section of the profile of directional drilling in a field test.

A MWD instrument containing a PCBA of the current disclosure was field tested in directional drilling. FIG. 16 shows a section in the profile of the directional drilling. Table 10 shows data corresponding to the section in FIG. 16. The well has a total depth of 7947 m. The vertical section has a depth of 7456 m and the horizontal section has a total length of 521 m. The build section is between a depth of about 7372 m to about 7480 m. The horizontal section started at point A, which has a horizontal displacement of about 50 meters. Point B is the position of the drill bit. The temperature in the pay zone is about 165-170° C. The MWD instrument operated for 297 hours downhole before it failed and was replaced.

TABLE 10

| Well Depth (m) | Vertical Depth (m) | Horizontal Displacement (m) | Azimuth (°) | Well Deflection (°) |
|---|---|---|---|---|
| 7402 | 7398 | −10 | 34.7 | 292.2 |
| 7411 | 7406 | −4 | 41.9 | 291.4 |
| 7421 | 7413 | 3 | 47.6 | 294.0 |
| 7431 | 7419 | 10 | 53.4 | 292.4 |
| 7440 | 7424 | 18 | 59.5 | 290.8 |
| 7450 | 7428 | 26 | 64.7 | 290.1 |
| 7469 | 7432 | 44 | 76.8 | 289.0 |
| 7478 | 7435 | 54 | 82.1 | 286.0 |
| 7498 | 7438 | 73 | 86.2 | 286.6 |
| 7527 | 7440 | 102 | 87.9 | 285.8 |
| 7575 | 7441 | 150 | 88.0 | 287.4 |
| 7623 | 7442 | 198 | 90.1 | 288.0 |
| 7681 | 7443 | 256 | 88.3 | 288.6 |
| 7729 | 7444 | 304 | 89.6 | 287.0 |
| 7778 | 7444 | 352 | 89.7 | 287.4 |
| 7826 | 7445 | 400 | 89.6 | 287.8 |
| 7874 | 7446 | 448 | 87.1 | 286.6 |
| 7922 | 7451 | 496 | 80.4 | 286.7 |
| 7947 | 7456 | 521 | 80.0 | 286.3 |

While in the foregoing specification this disclosure has been described in relation to certain preferred embodiments thereof, and many details have been set forth for purpose of illustration, it will be apparent to those skilled in the art that the disclosure is susceptible to alteration and that certain other details described herein can vary considerably without departing from the basic principles of the disclosure. In addition, it should be appreciated that structural features or method steps shown or described in any one embodiment herein can be used in other embodiments as well.

What is claimed is:

1. A method for assessing reliability of an electronic component under downhole vibration conditions, comprising:
    mounting one or more electronic components on a printed circuit board to form a test vehicle;
    measuring a natural vibration frequency of the test vehicle;
    choosing a test vibration frequency range that includes the natural vibration frequency of the test vehicle;
    determining an overstress limit of the test vehicle, wherein the overstress limit has a power spectral density (PSD) value of 0.6 $G^2$/Hz;
    determining a step stress profile for testing the test vehicle, wherein the step stress has a maximum value lower than the overstress limit of the test vehicle;
    testing the test vehicle according to the step stress profile until one or more of the plurality of electronic components on the test vehicle fails;
    measuring an electrical resistance of the failed electronic component without a vibration load;
    when the electrical resistance of the failed electronic component remains large, cross-sectioning the failed electronic component; and
    examining the cross-sectioned electronic component to identify a failure mode,
    wherein testing the test vehicle according to the step stress profile comprises applying to the test vehicle a stress of PSD value ranging from 0.1 $G^2$/Hz to 0.3 $G^2$/Hz.

2. The method of claim 1, wherein the electronic component is a plastic dual in-line package (PDIP) insertion mounted on the test vehicle.

3. The method of claim 2, wherein the PDIP has a plurality of lead terminals, and a metallurgy finish of the lead terminals is SnPd or Matte Sn.

4. The method of claim 2, wherein the failure mode is one or more selected from the group consisting of lead wire fracture, intermetallic solder-to-board pad separation, pad-to-board separation, and board trace.

5. The method of claim 1, wherein the electronic component is soldered to the printed circuit board.

6. The method of claim 5, wherein the solder is Sn37Pb (SnPb) or Sn3.0Ag0.5C (SAC).

7. The method of claim 5, wherein the printed circuit board comprises one or more pads, wherein a pad finish is selected from the group consisting of Hot Air Solder Leveled (HASL), immersion Sn (ImSn), immersion Ag (ImAg), electroless nickel immersion gold (ENIG), and organic solubility preservative (OSP).

8. The method of claim 1, wherein the electronic component has been aged at an elevated temperature for a period of time.

9. The method of claim 8, wherein the aging is conducted at 125° C. for 100 hours.

10. The method of claim 1, wherein the electronic component has been aged at a subzero temperature for a period of time.

11. The method of claim 10, wherein the aging is conducted at −50° C. for 1000 hours.

12. The method of claim 1, wherein the cross-sectioned electronic component is examined using an optical microscope or X-ray.

13. The method of claim 1, wherein the test vibration frequency ranges from 40 Hz to 500 Hz.

14. The method of claim 1, wherein the step stress profile comprises applying PSD of 0.1 $G^2$/Hz for 6 hours, 0.2 $G^2$/Hz for 6 hours, and 0.3 $G^2$/Hz for 6 hours in succession.

* * * * *